United States Patent
van Rensburg et al.

(10) Patent No.: US 12,170,742 B2
(45) Date of Patent: *Dec. 17, 2024

(54) SYSTEM AND METHOD OF CALLER VERIFICATION

(71) Applicant: RingCentral, Inc., Belmont, CA (US)

(72) Inventors: Christopher van Rensburg, Portland, OR (US); Tetsumasa Yoshikawa, San Francisco, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,689

(22) Filed: Jan. 20, 2023

(65) Prior Publication Data

US 2023/0156120 A1    May 18, 2023

Related U.S. Application Data

(63) Continuation of application No. 16/589,009, filed on Sep. 30, 2019, now Pat. No. 11,595,515.

(51) Int. Cl.
*H04M 3/42*       (2006.01)
*H04L 9/06*       (2006.01)
*H04L 9/08*       (2006.01)

(52) U.S. Cl.
CPC ...... *H04M 3/42042* (2013.01); *H04L 9/0643* (2013.01); *H04L 9/0869* (2013.01)

(58) Field of Classification Search
CPC . H04M 3/42042; H04L 9/0643; H04L 9/0869

USPC .................................................. 379/142.05
See application file for complete search history.

(56) References Cited

U.S. PATENT DOCUMENTS

| | | | |
|---|---|---|---|
| 6,850,979 B1 * | 2/2005 | Saulpaugh | G06Q 30/06 709/225 |
| 7,693,269 B2 * | 4/2010 | Sung | H04M 15/10 713/182 |
| 10,375,238 B1 * | 8/2019 | Stephens | H04M 7/0078 |
| 11,595,515 B2 * | 2/2023 | van Rensburg | H04M 3/42068 |
| 2003/0070069 A1 * | 4/2003 | Belapurkar | H04L 9/3226 726/8 |
| 2005/0084087 A1 * | 4/2005 | Rajagopalan | G06F 15/16 709/227 |
| 2005/0193201 A1 * | 9/2005 | Rahman | G06F 21/445 713/169 |
| 2007/0083918 A1 * | 4/2007 | Pearce | H04L 63/0428 726/5 |
| 2009/0217039 A1 * | 8/2009 | Kurapati | H04L 9/3273 713/168 |

(Continued)

*Primary Examiner* — Binh Kien Tieu

(57) ABSTRACT

A computer-implemented method and system for improving caller verification is provided. The method comprises registering an intended communications session by generating a key using, at least, a first call time window identifier, and storing the key in a database; in response to registering the intended communication session, receiving a request for caller verification, wherein the request comprises data representing a second call time window identifier; in response to receiving the request for caller verification, generating a comparison key based on the request; comparing the comparison key with the key stored in the database; and verifying the intended communication session in response to comparing the comparison key with the key.

20 Claims, 8 Drawing Sheets

(56) References Cited

U.S. PATENT DOCUMENTS

| | | | | |
|---|---|---|---|---|
| 2010/0197293 | A1* | 8/2010 | Shem-Tov | H04L 63/08 |
| | | | | 455/420 |
| 2013/0166918 | A1* | 6/2013 | Shahbazi | H04L 9/0863 |
| | | | | 713/183 |
| 2013/0329595 | A1* | 12/2013 | Scholz | H04L 65/80 |
| | | | | 370/252 |
| 2014/0270125 | A1* | 9/2014 | Khan | H04M 3/38 |
| | | | | 379/189 |
| 2019/0087566 | A1* | 3/2019 | Hosie | G06F 21/54 |

* cited by examiner

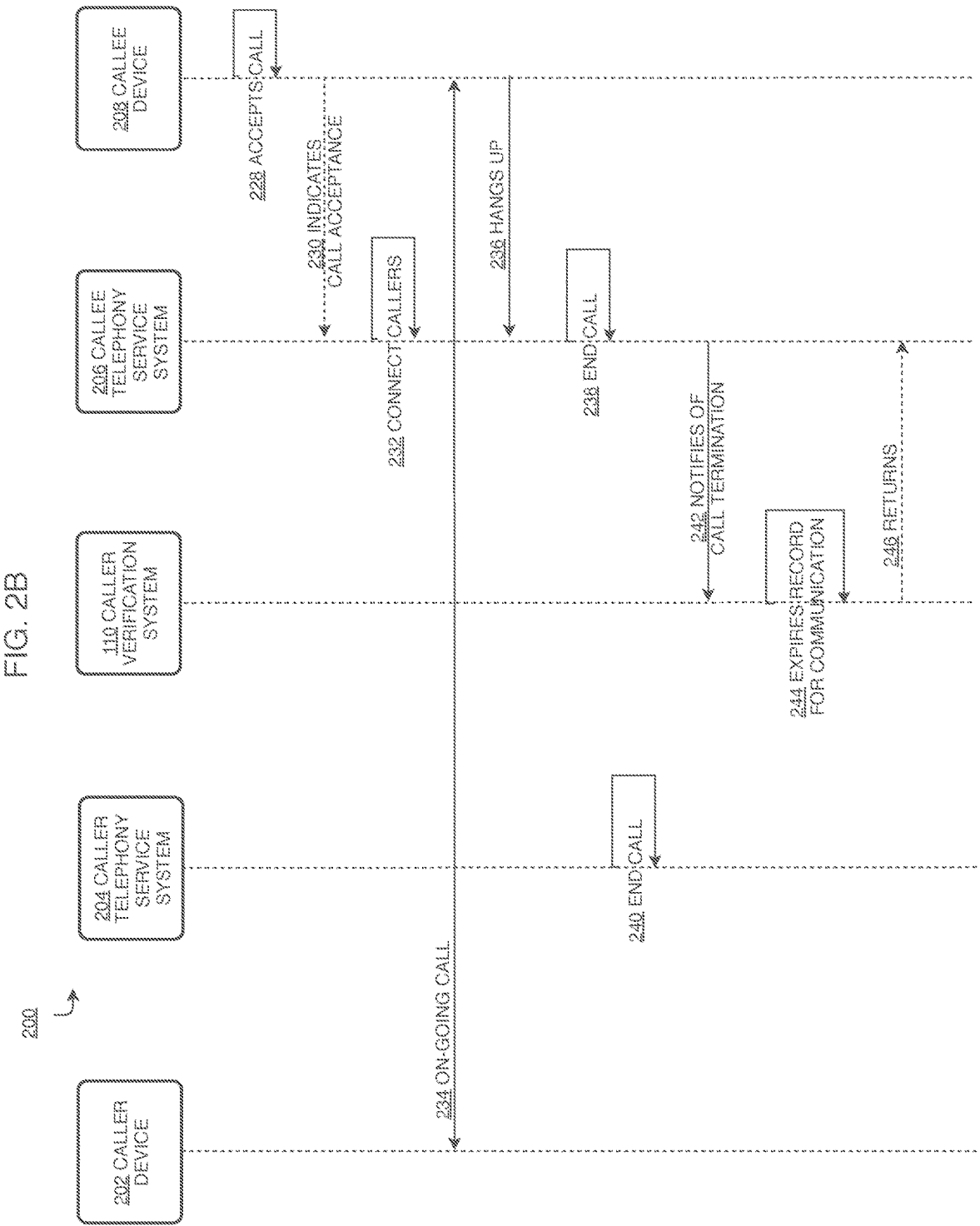

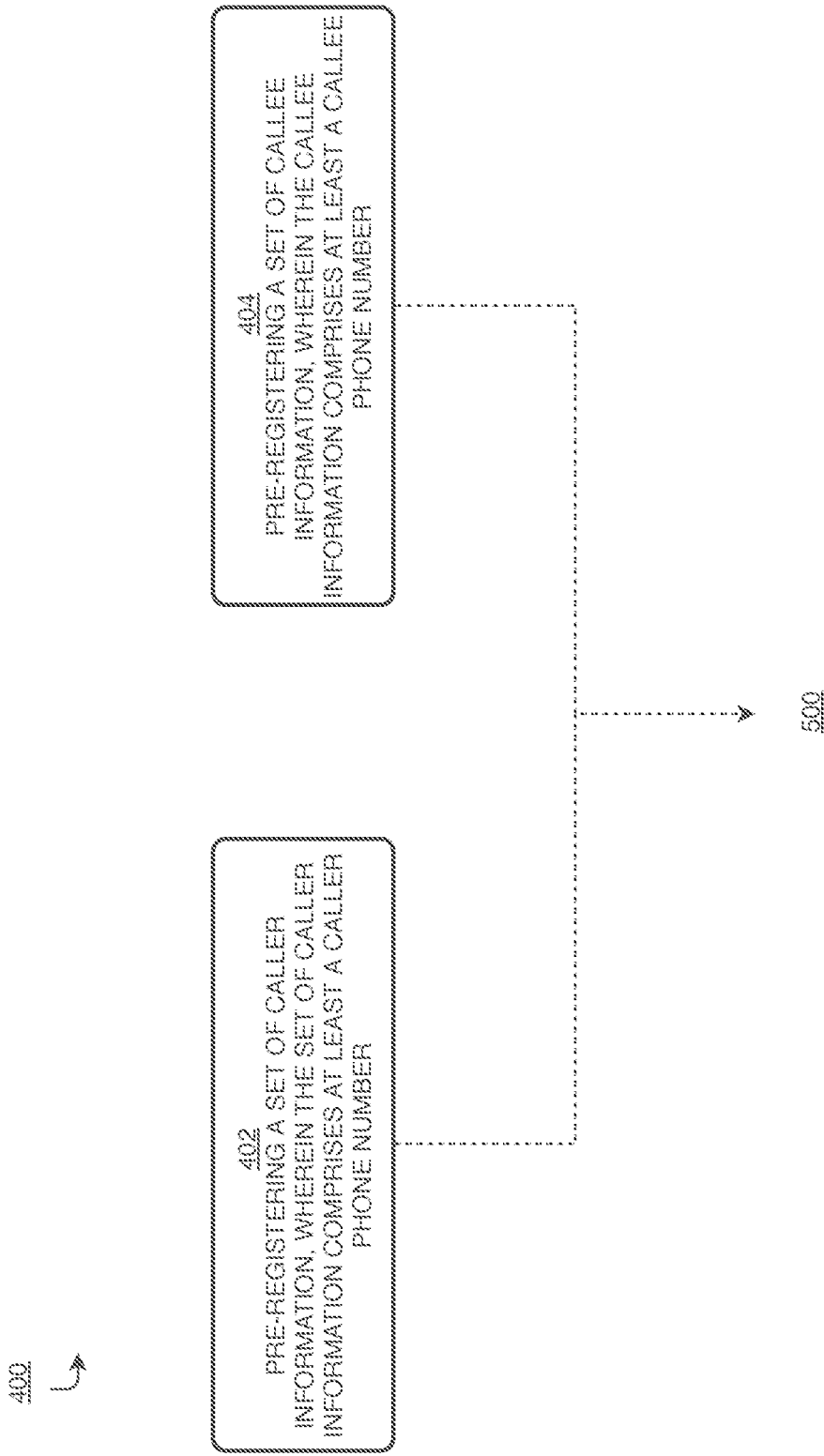

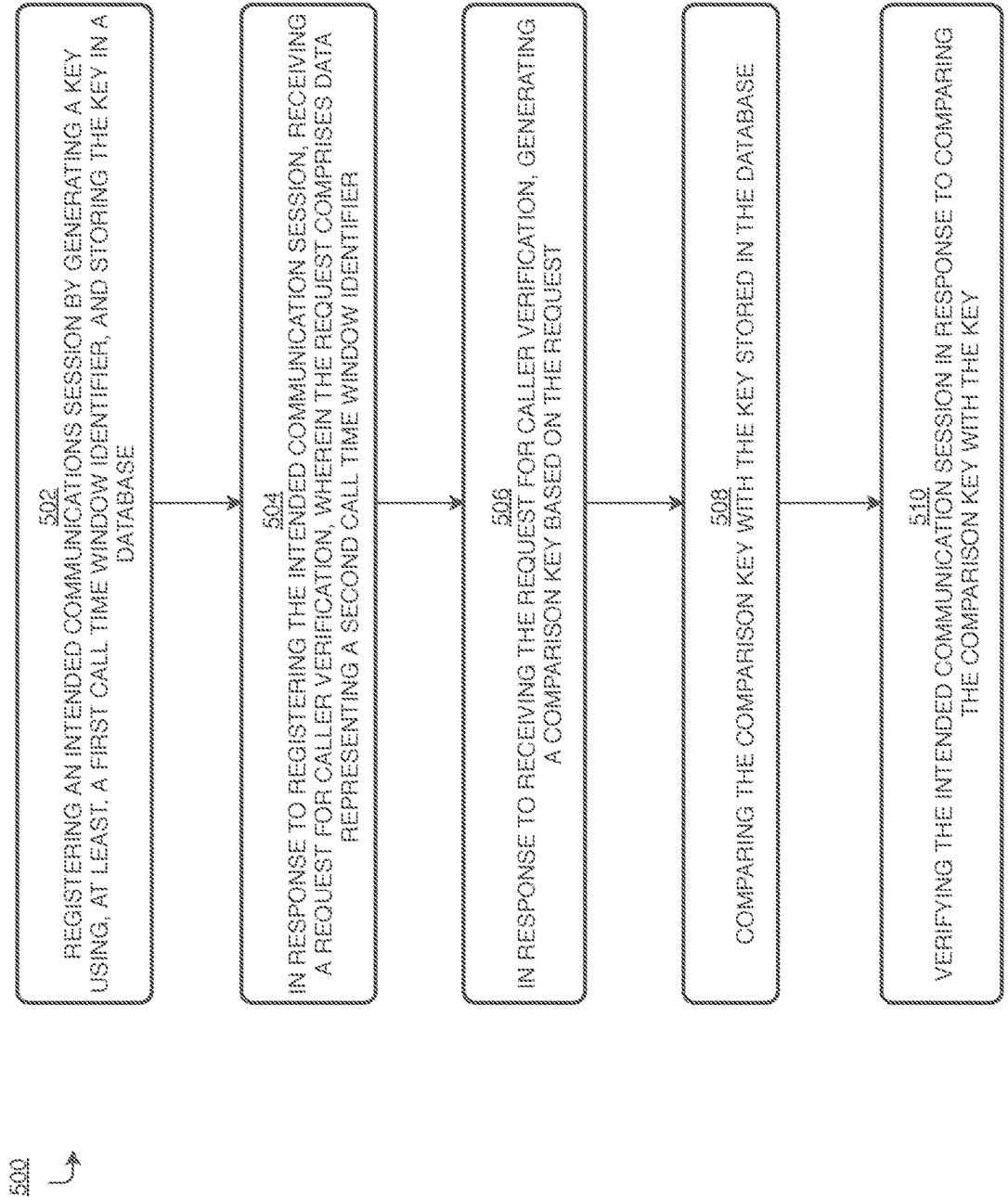

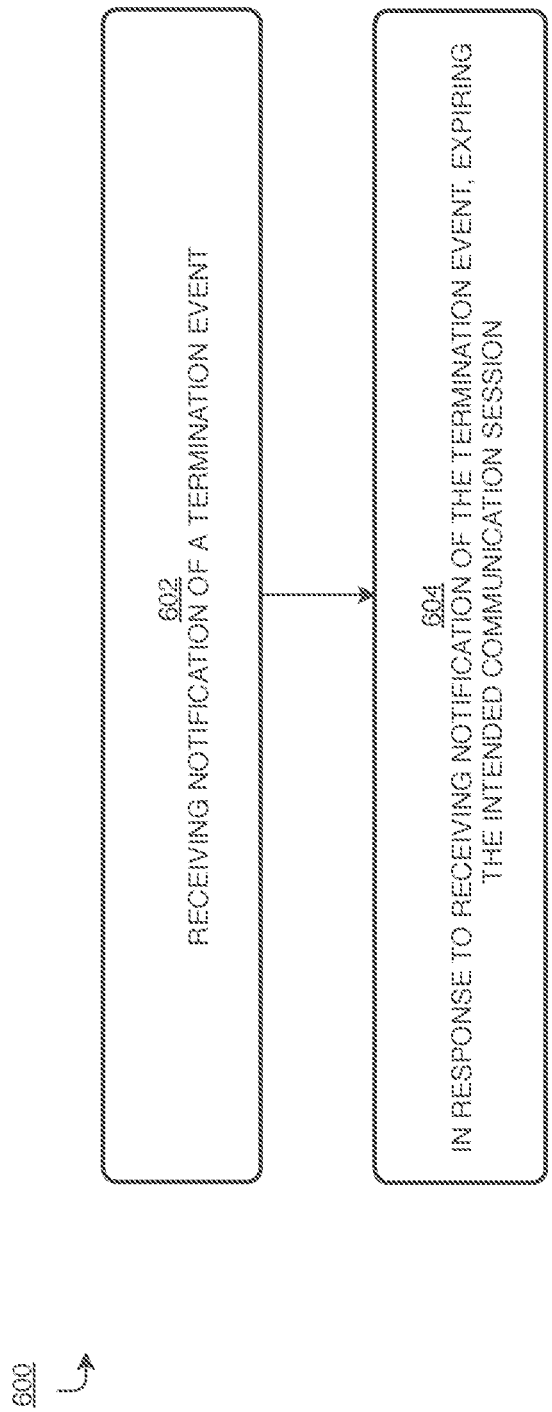

SYSTEM AND METHOD OF CALLER VERIFICATION

RELATED APPLICATIONS

The instant application is a continuation application and claims the benefit and priority to the U.S. patent application Ser. No. 16/589,009 filed on Sep. 30, 2019, which is incorporated herein by reference in its entirety.

TECHNICAL FIELD

The present disclosure relates generally to the field of caller verification. Specifically, the present disclosure relates to systems and methods for verifying caller identification.

BACKGROUND

Users of a telephony service often receive unwanted phone calls from a variety of callers engaging in phone-based campaigns. These phone-based campaigns range from telemarketing campaigns, political surveys, and charity drives to more nefarious phone scams, financial fraud schemes, identity theft schemes, and other scams.

Users who receive phone calls have no reliable means of identifying the caller for an incoming call before deciding to accept a call. The caller identification (ID) system often displays just a phone number to the recipient and there are no assurances that the caller is complying with legal requirements to not abuse the system by spoofing the caller ID. Appropriate use of the caller ID system is entirely at the discretion of callers, resulting in various types of abuses. For example, perpetrators of a robocalling scheme may spoof a caller ID to make it appear as through a call is coming from the same area code as that of the user.

Even in cases where a caller ID is not being spoofed, the information associated with the phone number displayed is limited. For example, since users often keep their mobile phone number permanently, even when they move to a new geographical location, an area code of a phone number is not guaranteed to reflect the real location of the caller. Consequently, the location displayed to the user who is receiving an incoming call cannot be relied on.

SUMMARY

The appended claims may serve as a summary of the invention.

BRIEF DESCRIPTION OF THE DRAWINGS

FIG. 2A and FIG. 2B are process flow diagrams that depict a process for confirming caller verification, in an embodiment.

FIG. 4 is a flow chart that shows a pre-registration process, in an embodiment.

FIG. 5 is a flow chart that shows an improved process for verifying callers, in an embodiment.

FIG. 6 is a flow chart that shows a process for expiring a registered communication session, in an embodiment.

DETAILED DESCRIPTION

Figure 1:
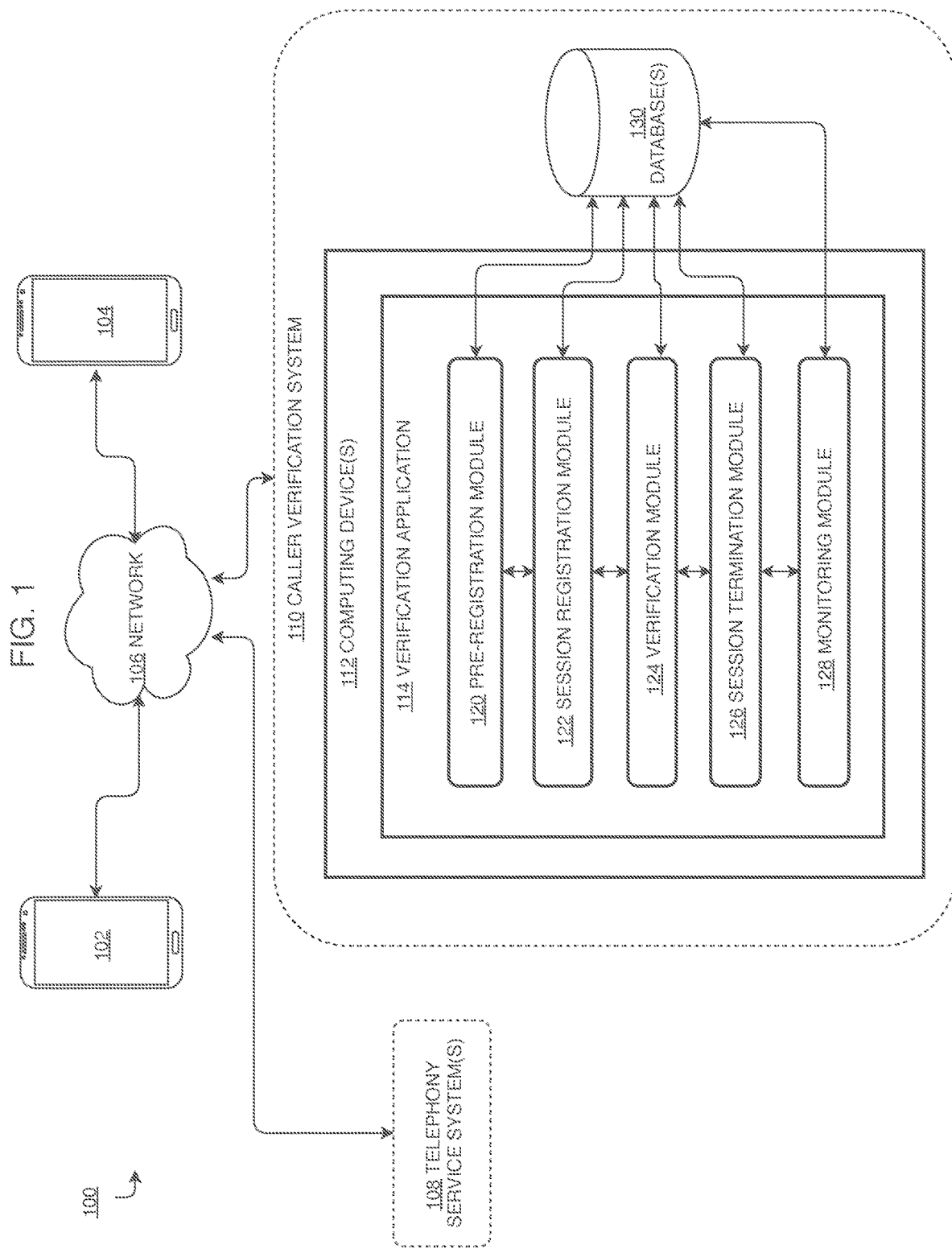
FIG. 1 is a network diagram that depicts a networked computer system, in an example embodiment.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form to avoid unnecessarily obscuring the present disclosure.

Embodiments are described in sections according to the following outline:

1.0 GENERAL OVERVIEW
2.0 STRUCTURAL OVERVIEW
    2.1 Client Devices
    2.2 Network
    2.3 Telephony Service Systems
    2.4 Caller Verification System
        2.4.1 Pre-registration Module
        2.4.2 Session Registration Module
        2.4.3 Verification Module
        2.4.4 Session Termination Module
        2.4.5 Monitoring Module
3.0 FUNCTIONAL OVERVIEW
    3.1 Caller Verification System
    3.2 Telephony Service Clients
    3.3 Telephony Service Users
    3.4 Registered Communications Store
    3.5 Registered Communication Item
        3.5.1 Caller Data
        3.5.2 Callee Data
        3.5.3 Shared Communication Token
        3.5.4 Communication Information
    3.6 Caller Verification Confidence Score
        3.6.1 Caller Side Confidence Score
        3.6.2 Caller Verification Service Confidence Score
        3.6.3 Callee Side Confidence Score
        3.6.4 Probationary Period
        3.6.5 Suspicious Activity Monitoring
        3.6.6 Reputation System
    3.7 Encryption for Privacy and Security
        3.7.1 Salted Hashing of Registered Communication Item Keys
        3.7.2 Encryption of Registered Communication Items
        3.7.3 Call Time Window Identifier
        3.7.4 Time-limited Cryptographic Salt
    3.8 Security
        3.8.1 Telephony Service Client Authentication
        3.8.2 Private Blockchain
        3.8.3 Ephemerality
        3.8.4 Anti-sniffing and Anti-harvesting
        3.8.5 No Search Query Capability
4.0 PROCEDURAL OVERVIEW

1.0 GENERAL OVERVIEW

Current caller identification information is often inaccurate or deceptive. Spoofing of phone numbers by bad actors is not only annoying but often poses security problems in the event that these bad actors successfully obtain sensitive information. Therefore, a system for confirming caller identities by verifying specific registered communication session between callers and callees is needed.

The present disclosure provides for an independent broker that verifies specific communication sessions for participating organizations or individuals that subscribe to telephony service providers that, in turn, provide this caller verification service. In some embodiments, the broker provides caller verification as a cloud service that is separate from client devices and telephony service providers. In an embodiment, the independent broker receives an intended call session from the caller device and the caller's telephone service provider and registers this intended call by generating a unique key. When the callee device receives a notification of the intended call, the callee device requests caller verification from the caller verification system. The caller verification system generates a comparison key using data provided with the request and compares the comparison key with the key. If a match is detected, then the caller is confirmed, and the call session is verified. If no match is detected, then the caller is not confirmed, and the call session is not verified. In some embodiments, the call session will automatically terminate if the caller is not confirmed. In other embodiments, an unconfirmed caller is placed on a blocked list, whereby future call sessions from the blocked caller are automatically terminated. In some embodiments, the caller verification system is applied to video calling or conferencing to verify a video caller.

The current disclosure also provides for a caller verification system that is implemented on backend servers associated with caller and callee client devices or telephony service providers rather than an independent broker. In such embodiments, the backend caller verification system registers an intended communication session with the independent broker before the communication is initiated. To prepare for the communication, the caller verification system produces a lookup key for the communication session using data that is not accessible to the broker. This data includes, for example, a caller phone number, a callee phone number, a time window identifier, and/or a cryptographic salt. In the context of a video call or video conference, the communication information may include access credentials, user identifiers, such as a name or handle, biometric information such as a facial image, fingerprint, voiceprint, or any other information that can be formatted to be hashed. The data is hashed using a first hash function to generate the lookup key, which is registered with the independent broker. The caller verification system also produces an encrypted supplemental information payload for the communication session. The key for encrypting the payload is generated using data that is not accessible to the broker in clear form, such as the caller phone number, the callee phone number, the time window identifier, and/or a cryptographic salt. The data is hashed using a second hash function to generate the encryption key.

In this embodiment, the supplemental information payload for a communication is encrypted before it is passed to the broker and cannot be decrypted by the broker because the key that is produced using the second hashing function is not passed to the broker. Furthermore, the lookup key that is passed to the broker (produced using the first hashing function), cannot be reversed by the broker to produce the original inputs into the hashing function. Therefore, even if the broker knows the encryption algorithm used for encrypting the supplemental information payload, as well as the second hashing function that is being used, the broker cannot produce the encryption key from the data it receives. This embodiment allows for added security if the broker's security were to be compromised.

In this embodiment, the callee device or backend server associated with the callee device uses the same second hash function to access the encrypted supplemented information. The encrypted supplemental information payload for the communication session can be decrypted by the callee device or backend server associated with the callee device using the call data that is known to both the caller and the callee. This data includes, for example, caller phone number, the callee phone number, the time window identifier, and/or the cryptographic salt, as previously disclosed.

The methods disclosed herein provide for several improvements that increase security and accuracy for caller and call session verification. Importantly, call time window identifiers are used to generate the unique key and the comparison key. These call time window identifiers are generated using specific date and/or timestamp information associated with call session, which provides the benefit of creating a unique, time-specific and time-limited identifier for comparison. A caller and callee would need to initiate and accept a call within a specific window of time, which is registered and compared, making it difficult for bad actors to mimic legitimate callers. Moreover, the key is generated by combining the call time window identifier with one or more other types of data and then hashing the combination. Hashing the combination of one or more unique components provides for an added layer of security, since bad actors would need not only each of the individual components, but also the specific hash algorithm in order to replicate the key. Therefore, the embodiments described herein provide for increases in call security, as well as increases in caller identification accuracy.

Embodiments of the present disclosure provide a system and method for improving caller verification. In some embodiments, an intended communication session is registered by generating a key using, at least, a first call time window identifier. The key is stored in a database. In response to registering the intended communication session, a request for caller verification is received. The request comprises data that represents a second call time window. In response to receiving the request, a comparison key is generated based on the request. The comparison key is compared to the key stored in the database and the intended communication session is verified.

According to another example embodiment of the present disclosure, a non-transitory, computer-readable medium stores a set of instructions. The instructions, when executed by a process, causes registering an intended communication session by generating a key using, at least, a first call time window identifier, and storing the key in a database. The instructions also cause, in response to registering the intended communication session, receiving a request for caller verification. The request comprises data that represents a second call time window identifier. In response to receiving the request, a comparison key is generated based on the request. The comparison key is compared to the key stored in the database and the intended communication session is verified.

According to another example embodiment of the present disclosure a system for improving caller verification is provided. The system comprises a processor and a memory operatively connected to the processor. The memory stores instructions that, when executed by the processor, cause registering an intended communications session by generating a key using, at least, a first call time window identifier. The key is stored in the database. In response to registering the intended communication session, a request for caller verification is received. The request comprises data representing a second call time window identifier. In response to receiving the request for caller verification, a comparison key is generated based on the request. The comparison key is compared with the key that is stored in the database and the intended communication session is verified.

2.0 STRUCTURAL OVERVIEW

FIG. 1 is a network diagram that depicts a networked computer system 100, in an example embodiment. In the embodiment of FIG. 1, the networked computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, smartphones, Internet of Things (IoT) devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

In the example of FIG. 1, a networked computer system 100 facilitates the exchange of data between programmed computing devices. In an embodiment, the networked computer system 100 may be a system of computing devices configured to verify caller identification by exchanging encrypted or unencrypted information related to the caller, callee, a call time window, or any other relevant data. Therefore, each of elements 102, 104, and 112 of FIG. 1 represents one or more computers that are configured to provide the functions and operations that are described further herein in connection with network communication. FIG. 1 illustrates only one of many possible arrangements of components configured to execute the programming described herein. Other arrangements may include fewer or different components, and the division of work between the components may vary depending on the arrangement. For example, while two client devices 102, 104 are depicted in FIG. 1, communication can occur between or among any number of client devices. Moreover, the network computer system 100 may feature any number of additional components that are not depicted.

2.1 Client Devices

Client device(s) 102, 104 are general or specialized computing devices, such as desktop computers, laptop computers, mobile smartphones, tablets, smartwatches, IoT devices, and so forth. Client device(s) 102, 104 are used to implemented computer programs, applications, methods, processes, or other software to perform embodiment described in the present disclosure. Specifically, client device(s) 102, 104 are configured to initiate telephony communications. Communication functions may be facilitated through one or more wired and/or wireless communication subsystems, which includes an Ethernet port, radio frequency receivers and transmitters and/or optical (e.g., infrared) receivers and transmitters. The specific design and implementation of the wired and/or wireless communication subsystem depends on the communication network(s) 106 over which the client device 102, 104 is intended to operate. For example, in some embodiments, the client device 102, 104 includes wired and/or wireless communication subsystems designed to operate over a GSM network, a GPRS network, an EDGE network, a Wi-Fi or WiMax network, and/or a Bluetooth® network.

2.2 Network

Network 106 broadly represents a combination of one or more local area networks (LANs), wide area networks (WANs), metropolitan area networks (MANs), global interconnected internetworks, such as the public internet, or a combination thereof. Each such network 106 uses or executes stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein are configured to connect to the network 106 and the disclosure presumes that all elements of FIG. 1 are communicatively coupled via network 106.

2.3 Telephony Service Systems

Telephony service system(s) 108 broadly represents one or more systems that provide telephony services. For example, the telephony service system 108 may be one or more interconnected systems of analog and/or digital wires as well as wired and wireless devices such as routers, switches, servers, databases, and so forth that telecommunication service providers use to provide telephone-related communication services. In some embodiments, these telephony services are provided through Public Switched Telephone Network (PSTN) systems, Voice over Internet Protocol (VoIP) systems, or any other telephony system.

2.4 Caller Verification System

A caller verification system 110 is a system for verifying callers. The system 110 comprises one or more computing device(s) 112 configured to execute a verification application 114. The verification application 114 is configured with one or more sets of instructions or module. In the example of FIG. 1, the application is configured with a pre-registration module 120, a session registration module 122, a verification module 124, a session termination module 126, and a monitoring module 128. For illustration purposes, in the example of FIG. 1, all modules are executed by one computing device 112. In other embodiments, the modules are executed by multiple computing devices 112. For example, one computing device can execute a select number of modules, while another computing device executes another select number of modules. In another embodiment, each module is executed by a dedicated computing device 112.

In some embodiments, the pre-registration module 120, session registration module 122, verification module 124, session termination module 126, and/or a monitoring module 128 are capable of generating or accessing information that is stored in one or more data stores or database(s) 130. Database 130 is one or more structured or non-structured data repositories that store data or information related to callers and/or callees, such as phone numbers, call time windows, and so forth. In some embodiments, the data is encrypted, hashed, and then stored in database 130 to ensure anonymity as further described herein. Database 130 may be configured as any number of separate databases for storing any type of data.

2.4.1 Pre-Registration Module

The pre-registration module 120 is configured to pre-register organizations or individuals who subscribe to telephony service systems 108 that participate in the caller verification service. When an organization or individual initially signs up service, the information provided may include one or more names of the organization or individual, a tax ID for organizations, associated phone numbers assigned to specific callers and/or callees, and any other pre-registration information. The pre-registration module 120 may receive this pre-registration information, including any caller and/or callee phone numbers assigned during initial onboarding and save this information in database 130. In some embodiments, the information may be encrypted and/or hashed.

2.4.2 Session Registration Module

The session registration module 122 is configured to register specific communications or communication sessions for subsequent verification. Specifically, the session registration module 122 receives data regarding an initiated call from, for example, the caller's telephony service system. In some embodiments, the session registration module 122 receives data regarding an initiated call directly from the caller's client device. For example, in some embodiments, the verification system functions parallel to but separate from communication services to and from a client device. In such embodiments, Internet-accessible client devices can use the Internet connectivity for verification while using PSTN systems for communication services rather than VoIP. In such embodiments, the registration and verification of communications is achieved through the Internet and uses very little bandwidth compared to using VoIP for real-time communication. The data includes, for example, caller data, callee data, communication information such as a call initiation time, and/or any other data related to the intended communication. In an embodiment, the session registration module 122 generates a call time window using the communication information. The session registration module 122 takes all the session-specific information, collectively referred to as a registered communication item, and hashes and/or encrypts the data to generate a key, which is stored in the database 130. The key is subsequently used to verify the caller, as further described herein.

In some embodiments, the session registration module 122 is implemented on the caller side such as on the client device or on a backend server associated with a caller client device. In such an embodiment, the key is produced without sharing the key inputs with any third parties, which avoids transmitting information in clear or raw form and avoids the exposure of such raw data in the event of security breaches. In this embodiment, only session-specific information that is known to both the caller and the callee is used to produce a lookup key. In another embodiment, the session registration module 122 is implemented by the telephony service system 108. In this embodiment, the call data and communication information can be kept private from a caller verification system embodied as a cloud service separate from the client devices 102, 104 and telephony service systems 108.

2.4.3 Verification Module

The verification module 124 is configured to verify the communication session using, for example, the key generated by the session registration module 122. Specifically, the verification module 124 receives a request for verification that was forwarded from a callee's device, such as client device 104, by the callee's telephony service system. The verification request contains data related to the caller, the callee, the communication, and/or any other data.

In response, the verification module 124 generates a comparison key based on the data provided with the request using the same hash algorithm used by the session registration module 122. The verification module 124 compares the comparison key with the key stored in the database 130 in order to verify the identity of the caller. In some instances, verification means determining that the comparison matches the key stored in the database 130. In other instances, verification means determining that the comparison key does not match any key stored in the database 130.

In some embodiments where the session registration module 122 is implemented on the caller side, the verification module 124 is implemented on the callee side. As discussed above, in such embodiments, only session-specific information that is known to both the caller and the callee is used.

2.4.4 Session Termination Module

The session termination module 126 is configured to monitor for a termination event. A termination event may be any event that indicates that information related to a communication session should be deleted, discarded, flagged, or altered, in part or in whole. For instance, a termination event can be the termination of a call that had been received by the callee, the expiration of a call time window, a callee's failure to answer a call, or any other event that indicates that a registered communication session should expire. Upon detecting a termination event, the session termination module 126 modifies the registered communication item and any associated data stored in the database 130 to expire or unregister the intended communication session. For example, the registered communication item and any associated data is deleted, discarded, flagged, or altered, in part or in whole.

2.4.5 Monitoring Module

The monitoring module 128 is configured for a variety of monitoring activities and responses. In one embodiment, the monitoring module 128 calculates confidence scores for determining how confident the caller verification system 110 is in the verification determination. In yet another embodiment, the monitoring module 128 is configured to evaluate the reputation of certain client devices 102, 104 and use the reputation in generating the confidence score for any particular communication session involving those client devices 102, 104. In some embodiments, the monitoring module 128 will track and flag suspicious activities, such as sniffing or harvesting behavior from certain client devices 102, 104 for subsequent use in determining the confidence score, for examples. In another embodiment, the monitoring module 128 evaluates new accounts for establishing probationary periods and probationary period restrictions.

3.0 FUNCTIONAL OVERVIEW

Each of the above components of FIG. 1 function together to create a caller verification system, as further described herein.

3.1 Caller Verification System

The caller verification system 110 is responsible for serving as an independent broker between a plurality of telephony service clients, such as the client devices 102, 104 of FIG. 1, and participating telephony services that provide phone service to their respective subscribers through telephony service systems 108. By serving as the broker, the caller verification system 110 allows subscribers of participating telephony services to verify the identity of callers for calls originating from other subscribers of participating telephony services.

In a typical embodiment, the various features of the caller verification system 110 may be made available to a plurality of telephony service clients, such as client device 102, 104, of participating telephony services by way of an Application Program Interface (API) embodied in a set of Representation State Transfer (RESTful) web services accessible over the Internet. In an embodiment, the API comprises several API endpoints exposing the features of the caller verification system 110.

In some embodiments, the caller verification system 110 features a service endpoint that allows a telephony service client to authenticate with the service and obtain a time-limited access token in order to perform subsequent API calls, as well as to obtain a time-limited cryptographic salt for use in producing salted hashes and encryption keys. In an embodiment, the service endpoint allows a telephony service client that is associated with the telephony service of a caller to register a communication so that the caller's identity can subsequently be verified by the callee. In another embodiment, the service endpoint also allows the telephony service client that is associated with the telephony service of a callee to verify the caller for an inbound call. In yet another embodiment, the service endpoint allows a telephony service client associated with the telephony service of a caller to expunge an entry for a communication it has previously registered, in the event that the callee may hang up the call or not answer the call.

3.2 Telephony Service Clients

The caller verification system 110 works with one or more telephony service clients, such as client devices 102, 104 of FIG. 1, which are associated with one or more participating telephony service providers and their telephony service systems 106. The telephony service clients, such as client device 102, 104, subscribe to the services of the caller verification system 110 and employ the various features to provide caller verification to the respective telephony service providers' customers, or the telephony service users. Any telephony service users who are callers are identified and any telephony service users who are callees will be able to view the identity of the callers from whom they are receiving calls.

In an embodiment, the caller verification system 110 supports a variety of different types of participating telephony service providers, including but not limited to: traditional PSTN (Public Switched Telephone Network) service providers, Mobile Network Operator (MNO) service providers, Mobile Virtual Network Operator (MVNO) service providers, and Voice over IP (VoIP) service providers.

3.3 Telephony Service Users

A telephony service user is a subscriber to one or more participating telephony service providers. The users receive the benefits of the caller verification system 110 features by way of the telephony service clients, such as client device 102, 104. The participating telephony service providers subscribe to the services of the caller verification system 110. The system, in turn, conveys information regarding registered communications in parallel to the standard transports employed during the communications. Therefore, the caller verification system 110 functions parallel with and in association with regular communication protocols.

3.4 Registered Communications Store

In an embodiment, a registered communication store, such as database 130 of FIG. 1, is used to store registered communication items. In an embodiment, each registered communication item represents the registration of a communication session between at least a caller and a callee. These items are submitted to the registered communications store by the telephony service client at the behest of the caller, who is a subscriber of the participating telephony service associated with the telephony service client. In a typical embodiment, the structure of the registered communications store may take the form of a simple key/value lookup or dictionary.

3.5 Registered Communication Item

Any number of registered communication items may be stored in a registered communication store such as database 130. Each of these registered communication items describes a communication or communication session that has been registered with the caller verification system 110 using one of the participating telephony service clients, such as client device 102, 104, in response to a subscriber of a participating telephony service initiating a call.

In some embodiments, a registered communication item is a set of data. In an example embodiment, this set of data includes caller data, which is information identifying and describing the caller, as further described herein. In another embodiment, the set of data also includes callee data, which is information identifying and describing the callee, as further described herein. In yet another embodiment, the set of data also includes communication information, which is information describing the nature, intent, purpose, and/or content of the communication, as further described herein. In an embodiment, the data associated with the registered communication item is encrypted, combined, and/or hashed before it is stored in database 130. In some embodiments, the data associated with the registered communication item is encrypted, combined, and/or hashed before being transmitted to the caller verification system 110 such that the data is not visible to the caller verification system.

3.5.1 Caller Data

A registered communication item contains at least a set of caller data. In some embodiments, the caller data may include one or more fields of data identifying and describing aspects of the caller, such as the caller's phone number, full name, the organization to which the caller belongs or is representing for the scope of the call, a title, level, position, role, or function of the caller in the context of the organization to which the caller belongs or is representing, and so forth. For example, a caller may be an individual who works for a bank's fraud department who calls a customer of the bank to warn about potentially fraudulent charges. The caller data, in this example, may include the caller's phone number, full name, the bank name, the caller's title at the bank, and so forth. Any number of fields identifying any number of caller characteristics may be used.

Furthermore, the caller data may contain binary data objects, such as an image object that is used as an avatar for visually representing the caller to the callee, an image object that is used as a logo for visually representing the organization to which the caller belongs or that the caller is representing, or any other binary data object.

3.5.2 Callee Data

A registered communication item may optionally contain a set of callee data. In some embodiments, the callee data may include one or more fields of data identifying and describing aspects of the callee, such as the callee's phone number, full name, email address, physical mailing address, or other callee information that may be expected to only be known by the organization to which the caller belongs or is representing, such as a customer ID or account ID for the callee with that organization. In the example above, if the caller works for a bank's fraud department and calls a customer of the bank to warn about potentially fraudulent charges, the callee data may include the bank customer's phone number, full name, email address, physical mailing address, the customer's bank ID or account ID, and so forth.

In some embodiments, the telephony service client serving the callee in a communication may verify aspects of the callee data contained in the registered communication item as a means of further validating the legitimacy of a communication. This additional validation increases the level of confidence in the system's verification of the caller, based upon the amount of accurate information that the caller knows about the callee. The aspects of any accurately known information may be weighted based on the level of specificity, rarity, lack of public availability, or any other factor.

3.5.3 Shared Communication Tokens

In some embodiments, an additional mechanism may be provided whereby pairs of telephony service users configure, for their telephony communications with one another, an additional token that is passed through the caller verification system 110 each time in order to increase the security of the caller verification process.

For example, a high-ranking corporate executive and that executive's personal lawyer may agree that, in order to verify each other's identity in communications, they should adopt a special token for use in their communications. Upon agreeing on a token, the executive would add the token to his or her contact details for the lawyer, and the lawyer would add the token to his or her contact details for the executive. According to this embodiment, when the lawyer initiates a phone call to the executive, the token is retrieved from the contact details for the executive and included in the callee data that is part of the registered communication item, which in turn, is registered with the caller verification system 110 by the telephony service client associated with the telephony service in use by the lawyer. Upon receiving an incoming call from the lawyer, the telephony service client in use by the executive performs verification of the caller using the caller verification system 110, from which it receives an encrypted registered communication item for the call. Upon decrypting the registered communication item, the caller verification system 110 is able to retrieve the token from the callee data and verify that it matches the value configured in the executive's contact for the lawyer.

In some embodiments, in the interest of maintaining the privacy of any communication tokens shared by pairs of users, such tokens may not be passed in a raw form by the phone client application through the telephony service clients, such as client device 102, 104, and the caller verification system 110. Rather, a hashed value may be generated and passed. Subsequently, telephony service client serving the callee in a communication matches the hashed value passed from the phone client application of the callee to the hashed value passed from the phone client application of the caller through the telephony service client serving the caller and contained in the callee data portion of the registered communication item.

Since some users use the same communication token value for multiple contacts, further security can be ensured, and collisions in hashes of the communication tokens can be avoided, by increasing the uniqueness of the value being hashed by combining the ASCIIbetically sorted phone numbers of the two parties with the shared communication token value. For example, a first phone number (111) 222-3333, a second phone number (444) 555-6666, and the secret token may all be combined together and subsequently hashed. Furthermore, in order to avoid the hashed value being reused outside of the context of the current communication, the value being hashed may also incorporate a call time window identifier, and/or a time-limited cryptographic salt, as further described herein.

In an embodiment, any layer of verification is incorporated into a caller verification confidence score, as further described herein. This score may be presented to a callee visually in a display screen, auditorily via a speaker, or through any other presentation method. In some embodiments, the score determines or influences other behaviors of the telephony service, such as by imposing additional layers of call screening or engaging other call handling logic, such as routing calls straight to voicemail.

3.5.4 Communication Information

In an embodiment, a registered communication item may optionally contain a set of communication information. This set of communication information may include one or more fields of data describing dates and/or timestamps for initiation of the communication, the intent, purpose, scope, context, or topic, for the communication, reference material or links relevant to the communication, or any other information supporting the communication that can be passed along to the callee, or otherwise used in the caller verification process.

3.6 Caller Verification Confidence Score

In some embodiments of the caller verification system 110, a caller verification confidence score is computed to indicate a level of confidence in the caller verification for any given call. This score may be computed by the caller verification system 110, the telephony service clients, such as client device 102, 104, associated with the telephony services of the users that are party to a call, or any combination thereof

3.6.1 Caller Side Confidence Score

In some embodiments, a component of the caller verification confidence score is contributed on the caller side by the telephony service client serving the caller. This caller side telephony service client may employ any one or more means in computing this confidence score. For instance, the telephony service client can evaluate how the identity of the caller has been verified, such as if the subscriber name corresponds to a verified billing address associated with a credit card on file, or if the subscriber's identity has been warranted by a trusted organization such as a government agency or a large and well established employer in the private sector. The telephony service client can also evaluate how long the identity of the subscriber has been associated with the phone number. In another instance, the client can evaluate whether the call is coming from a mobile device that is associated with a particular user's phone number and whether the particular user has recently unlocked the phone using a secure means, such as fingerprint ID, facial ID, voice ID, a combination of these, or any other supported means. The telephony service client can also evaluate whether the caller has initiated dialing by voice command, during which the phone application client has performed voice signature analysis and matched the voice signature of the caller against a voice signature on record. In another instance, the telephony service client can evaluate whether the phone application client has identified the caller by a facial recognition technology and matched the face of the caller with a facial ID on record. Any number of different means may be employed in computing this confidence score.

3.6.2 Caller Verification System Confidence Score

In some embodiments, a component of the caller verification confidence score may be contributed by the caller verification system 110. The caller verification system 110 may employ any one or more means in computing this confidence score. For instance, the caller verification system 110 can use the monitoring module 128 to evaluate how long the account used by the telephony service client serving the caller has been held with the caller verification system 110. Monitoring module 128 can also evaluate the size, tier, or service level of the caller verification system account used by the telephony service client serving the caller. In another instance, the monitoring module 128 can evaluate how the identity of the organization behind the telephony service client serving the caller has been identified by the caller verification system 110 during account setup. The monitoring module 128 can also evaluate a history of use of the caller verification system 110 by the telephony service client serving the caller, including a reputation established by the monitoring module 128 of the caller verification system 110, as well as a history of suspicious activity, potential abuses, disputed caller identifications, as detected by the monitoring module 128 of the caller verification system 110. Any number of different means may be employed in computing this confidence score.

3.6.3 Callee Side Confidence Score

In some embodiments, a component of the caller verification confidence score may be contributed on the callee side by the telephony service client serving the callee. This callee side telephony service client may employ numerous means in computing its confidence score. For instance, the telephony service client can evaluate whether information that is declared about the callee, as contained in the callee data portion of the registered communication item, is accurate for the callee. Similarly, the telephony service client can also evaluate whether information that is declared about the caller, as contained in the caller information portion of the registered communication item, agrees with what the callee knows about the identity claimed by the caller. In another instance, the client can evaluate whether the caller, according to his or her claimed identity, is a person who can reasonably be expected to call the callee. Similarly, the client can also evaluate whether information that is declared about the nature of the communication, as contained in the communication information part of the registered communication item, indicates a communication that can reasonably be expected to take place with the callee, and between the caller and the callee. In another instance, the client can evaluate whether a shared communication token has been provided as a part of the registered communication item and whether it matches a value that is held by the callee, indicating agreement between the caller's version and the callee's version.

3.6.4 Probationary Periods

In some embodiments, the caller verification system 110 may impose probationary periods on new accounts of telephony service clients, such as client device 102, 104, using the monitoring module 128. In some embodiments, the determination of whether a probationary period should be imposed, the length of any such probationary period, and the types of measures enacted during such a probationary period may be influenced by numerous factors. For instance, the monitoring module 128 can evaluate the level or tier of service that the telephony service client has signed up for, the contract period that the telephony service client has signed up for, or the primary geographical region of the telephony service associated with the telephony service client. The monitoring module 128 can also evaluate the business size of the telephony service associated with the telephony service client, or any available reputation or customer satisfaction information regarding the telephony service associated with the telephony service client. Any number of different means for evaluating and establishing a probationary period may be used.

During a probationary period for a telephony service client, the monitoring module 128 enacts measures such as more rigorous monitoring of and greater oversight of the use of the caller verification system API. In an embodiment, the caller verification system 110 also applies a lowering factor against caller verification confidence scores produced by the system for registered communication items that have been registered with the system on behalf of callers using the associated telephony service.

At the end of a probationary period for a new account, the behavior of the client during that period is assessed and various determinations are reached. For example, determinations are made as to whether the probationary measures should be lifted in their entirety, whether certain specific of the measures should be continued for a further period, whether the account should be terminated, whether issues should be investigated with the associated telephony service, and so forth. Any number of determinations and appropriate responses may be made.

3.6.5 Suspicious Activity Monitoring

In some embodiments, the caller verification system 110 uses the monitoring module 128 for monitoring the use of the caller verification system API by telephony service clients in order to identify potential cases of attempted abuse of the service by bad actors, such as attempts to "sniff" for registered communication items of communications to which the telephony service of a telephony service client is not a party.

Given the nature of how hashed keys for registered communication items are produced, a bad actor client will need to repeatedly guess the data inputs for generating a hashed key many times before finding a successful hit. As such, repeated failed attempts to retrieve a registered communication item using different keys may reasonably be regarded as suspicious activity by the monitoring module 128 and may be flagged for investigation by an operations team. Furthermore, upon detecting such potentially suspicious activity, the monitoring module 128 may enact immediate measures to restrict access by the telephony service client to the caller verification system API. Such restrictions include blocking access to the service in its entirety, throttling usage of the entire service, or throttling or entirely blocking usage of a particular feature suspected of being abused, such as, for example, the retrieval of registered communication items.

3.6.6 Reputation System

In some embodiments, the caller verification system 110 uses the monitoring module 128 and database 130 to maintain a reputation system for telephony service clients, such as client device 102, 104. This reputation system keeps reputation scores for each of the telephony service clients. In an embodiment, the reputation for any client is based on feedback received from other telephony service clients on the quality of the caller identification contained in the registered communication items that are registered with the caller verification system 110 by the client. In some embodiments, such feedback is based on a combination of cross-checking caller data contained inside the registered communication items with other available sources of information, as well as feedback provided by the callee through a user interface of the telephony device on which a call is received.

In some embodiments, monitoring module 128 incorporates the reputation of a telephony service client into its calculation of a caller verification confidence score for calls where the telephony service client is registering a registered communication item with the service on behalf of a caller. Any communications registered by a telephony service client with a low reputation score may receive a caller verification confidence score that is weighted lower than telephony service clients with unblemished reputations.

3.7 Encryption for Privacy and Security

In an embodiment, for reasons of privacy and security, the keys for registered communication items are undecipherable hashes and the values or contents of registered communication items are encrypted objects. Furthermore, the strategies employed for production of the hashed keys and encrypted contents may be aimed at ensuring that only the telephony service clients associated with the parties to a communication are able to store, retrieve, and read the information contained inside the registered communication item for a communication session, and not the caller verification system 110 or other telephony service clients not associated with the parties to a communication.

3.7.1 Salted Hashing of Registered Communication Item Keys

For reasons of privacy and security, the keys used in indexing registered communication items in the registered communications store such as database 130 may be hashed in such a way that only those telephony service clients of the parties involved in communications may be able to specify valid registered communication items for those communications. Consequently, telephony service clients of other participating telephony services whose subscribers are not party to the associated communications may not specify valid registered communication items for those particular communication sessions.

In a typical embodiment, the key hashing strategy includes using a hash algorithm that is stipulated by the caller verification system 110 and that is consistently employed by all telephony service clients. The key hashing strategy also includes producing a hash of a combination of data that is known to the parties involved in the communication session but not known to the caller verification system 110. For instance, the hashing may be a combination of the caller phone number, the callee phone number, a call time window identifier, and/or a time-limited cryptographic salt supplied by the caller verification system 110.

3.7.2 Encryption of Registered Communication Items

In an embodiment, the contents of a registered communication item are encrypted in such a way that only the telephony service clients of the parties involved in the associated communication have access to the information contained inside the registered communication item. Consequently, the caller verification system 110 and the telephony service clients of other participating telephony services whose subscribers are not party to the associated communication may not have access to the information contained inside the registered communication item.

In a typical embodiment, the encryption strategy includes using a strong encryption and decryption algorithm that is stipulated by the caller verification system 110 and that is consistently employed by all telephony service clients. The encryption strategy includes producing a key for encrypting and decrypting the contents of registered communication items using data that is known to the parties involved in the associated communication but not to the caller verification system 110. For instance, the encryption may be combination of the caller phone number, the callee phone number, a call time window identifier, a shared communication token that is known by both the caller and the callee and is designated for use in producing a key, and/or a time-limited cryptographic salt supplied by the caller verification system 110.

3.7.3 Call Time Window Identifier

In an embodiment, the system employs a means of calculating a call time window identifier for calls. This call time window identifier is used as one of the inputs when forming hashed keys for registered communication items in the registered communications store such as database 130. The use of this call time window strengthens the uniqueness of the keys and limits the potential for guessing by malicious telephony service clients or other bad actor clients accessing the caller verification system 110.

According to this embodiment, a time window is computed for a call based upon the time that the call is initiated by a caller, the time that the call is received by a callee, the time that a callee requests caller verification, or any other time related to the specific communication session. Considering that there is some latency between a call being initiated by a caller and being received by a callee, a time window size is stipulated by the caller verification system 110 and, in an embodiment, agreed upon by telephony service clients. The time window size should be large enough to ensure that the values computed by the caller and the callee will agree, but also small enough so that the call time window identifier adds a valuable amount of uniqueness and, therefore, strength to the hashed keys for registered communication items. In order for a caller or a callee to compute a value for the call time window, the time is converted to a common time zone such as the Coordinated Universal Time (UTC) zone and is then quantized to fall into a time window, such as two-minute windows, five-minute windows, ten-minute windows, or any other suitable and mutually agreed upon size of time window. The quantized time window is then assigned an identifier to represent the specific quantized call time window.

In some embodiments, the call time window is adaptive to the situation and/or users. For example, a machine learning algorithm can be used to learn, over time, an optimal time period for the call time window. In some embodiments, the machine learning algorithm may be used to learn and customize time periods for the call time window of specific users or for users in a specific environment with limited access to service. For example, some users in a particularly remote location may all experience poor connectivity, which requires a longer call time window. In yet another embodiment, the call time window may be adaptive to improvements in technology that increase connectivity and, therefore, decrease the need for longer windows. When authenticating with the caller verification system 110, telephony service clients 102, 104 may receive instruction from caller verification system 110 on a call time window size that should be used when computing call time window identifiers, thus allowing the call time window to be adaptive while still ensuring consistency in how telephony service clients 102, 104 compute call time window identifiers.

Approaches may be adopted for dealing with edge cases where a call is initiated close to an end boundary of a time window and where the call time window identifier computed at the caller side may, therefore, differ from the call time window identifier computer at the callee side, particular when there is greater latency in connecting a call. One such approach may involve the telephony service client that is registering a registered communication item on behalf of a caller providing two keys for the lookup of the item. For example, one key is produced using the computed call time window identifier, and another key is produced using the computed call time window identifier advanced by one time window.

3.7.4 Time-Limited Cryptographic Salt

As a means of supporting the ephemerality of registered communication items, and thereby increasing the security of the system, an embodiment of the system employs a mechanism of a time-limited cryptographic salt. A salt may be randomly generated by the caller verification system 110 and supplied to telephony service clients upon their authentication with the service. The authentication enables the clients to produce hashed keys for indexing registered communication items in the registered communications store such as database 130, and also enables the client to produce encryption keys for encrypting and decrypting the contents of registered communication items. In an embodiment, the salt may only be valid for a limited window of time, such as one hour, one day, or any other limited time window. This ensures that a telephony service client would not be able to gain access to registered communication items from past windows of time using a salt provided for a current window of time. The client would need to know the salt that had been used for the specific registered communication items it was attempting to access.

3.8 Security

The caller verification system 110 incorporates numerous strategies and mechanisms for ensuring security, as further described herein.

3.8.1 Telephony Service Client Authentication

In one embodiment, telephony service clients are authenticated with the caller verification system 110 by way of an authentication API endpoint. Upon authentication, telephony service clients are provided with an access token that is used for subsequent requests. For security purposes, telephony service clients may be required to refresh their access token at regular intervals, such as once every few hours, once every day, once every week, or any other interval of time. In addition to receiving a fresh access token upon authenticating, telephony service clients may also be provided with a fresh time-limited cryptographic salt that should be used when producing hashed keys and encryption keys for registered communication items.

3.8.2 Private Blockchain

In an embodiment, the caller verification system 110 is structured as an independent cloud-based service that is shared as a common caller verification resource by a multitude participating telephony services. Such a cloud-based service may employ any means at its discretion to guarantee high availability, high redundancy, and high security and temper-resistance for the registered communication items contained within the registered communications store, such as database 130.

In some embodiments, the service may employ a private blockchain approach comprising multiple distributed ledger nodes across a network, leveraging mechanisms of this technology to ensure replication and synchronization of entries in the distributed ledger in a way that is safe from malicious hacking and attempts at falsification or unauthorized retrieval. Furthermore, in some embodiments the nodes of the distributed ledger may be maintained and managed by certain larger of the participating telephony services who agree to form an industry consortium for this purpose and contribute their resources towards maintaining nodes of the distributed ledger.

3.8.3 Ephemerality

One aspect of the security of the caller verification system 110 is the inherent ephemerality of the data stored in the form of the registered communication items contained within the registered communications store. Specifically, the function of the system is the verification of communications and the identity of callers in communications with high confidence specifically while those communications are being conducted. In an embodiment, the system does not persist historical records of communications beyond serving the needs of caller verification. In some instances, having registered communication items accessible long after the associated communications have occurred, even if cryptographic techniques are employed for hashing keys and encrypting contents, may expose the communication history of end users, such as their Customer Proprietary Network Information (CPNI). Long-term storage of this type of information increases the risk of exposure in data breaches.

Consequently, the caller verification system 110 may employ one or more approaches for expunging the stale registered communication items. According to one approach, registered communication items are completely removed from the registered communication store, such as database 130, immediately upon successful verification by the telephony service client serving the callee in a call or immediately upon conclusion of the associated call. According to another embodiment, registered communication items are flagged as expired, used, or defunct immediately upon successful verification by the telephony service client serving the callee in a call, or immediately upon conclusion of the associated call. In this embodiment, the flagged registered communication items are subsequently removed during a batch cleanup process that is run at regular intervals in the background, such as once per day, once per week, or any other regular time intervals. In another embodiment, all registered communication items may be assigned a standard Time to Live (TTL) period. A batch process that is run at regular intervals in the background identifies registered communication items that have expired according to the time since their creation exceeding the TTL period, thereby covering cases where no positive signal was ever received by the caller verification system 110 for expiring of an item.

In yet another embodiment, expired registered communication items may not be completely removed from the registered communications store such as database 130. In yet another embodiment, the expired registered communication item may not be completely removed for some amount of time after expiring; rather, only call-specific contents are removed from the items. For example, the caller data, the callee data, and the communication information may all be removed, while the information relating to the creation and access are retained. Information that is retained may include, for example, the time that the item was created, an identifier indicating the telephony service client that created it, and/or an identifier indicating the telephony service client that accessed it during caller verification. By persisting the shell pertaining to the creation and access of a registered communication item but not the content, the caller verification system 110 would be able to perform better monitoring for detecting suspicious activity, since attempts to access long past items with valid hashed keys may be seen as a positive sign of a data vulnerability in some aspect of the caller verification system 110 or the participating telephony services using the Caller verification system 110.

Notwithstanding the described processes for expunging expired registered communication items, a policy of incorporating call time window identifiers into hashed keys and content encryption keys for registered communication items inherently puts the burden on the telephony service clients to persist the information needed for generating the keys to support attempts at later retrieval. This creates an obstacle to later recovery of any items that may not have been expunged. Similarly, incorporating a time-limited cryptographic salt into hashed keys and content encryption keys also inherently puts the burden on the telephony service clients to persist the salt for generating the keys to support attempts at later retrieval, creating an obstacle to later recovery of any items that may not have been expunged. In an embodiment, a strategy to address these issues includes requiring that keys for registered communication items contain the unaltered form of the time-limited cryptographic salt as a prefix, before any undecipherable hashed part, making it possible for the caller verification system 110 to easily fail validation of keys for long past communications and only pass validation for keys containing the prefix corresponding to the valid current salt in circulation.

3.8.4 Anti-Sniffing and Anti-Harvesting

The hashing and encryption strategies have the benefit of substantially limiting the ability of bad actors to programmatically sniff for information regarding registered communications for which they do not have legitimate reasons to access. Firstly, it would be prohibitively difficult for a bad actor to successfully generate a hashed key that matches one stored in the registered communications store. Secondly, it would be prohibitively difficult for a bad actor to decrypt the contents of any registered communication items it was able to retrieve from the store. Finally, a monitoring feature, such as monitoring module 128 of FIG. 1 may monitor for suspicious patterns of repeated failed attempts to retrieve registered communication items by a telephony service client. Upon detecting any suspicious activity, the monitoring module 128 flags this activity and the responsible client for investigation by security and/or fraud protection teams that maintain the caller verification system 110.

3.8.5 No Search Query Capability

Many embodiments of the caller verification system's API are deliberately restricted to single actions for explicitly identified registered communication items. No means are provided to telephony service clients to obtain lists of registered communication items of indeterminate size or variable contents by any sort of query language or wildcarding scheme.

Moreover, given that the hashed keys and the encrypted contents for registered communication items are opaque and effectively undecipherable to the caller verification system 110, no meaningful or practicable way exists for the service to query the registered communications store such as database 130 using parameters such as caller phone number, callee phone number, caller name, callee name, and so forth in order to produce result sets of multiple registered communication items. Therefore, it is not possible for a bad actor to harvest data from the caller verification system's API that may allow insight into communications history relating to caller verification that is brokered through the system.

4.0 PROCEDURAL OVERVIEW

Figure 2A:
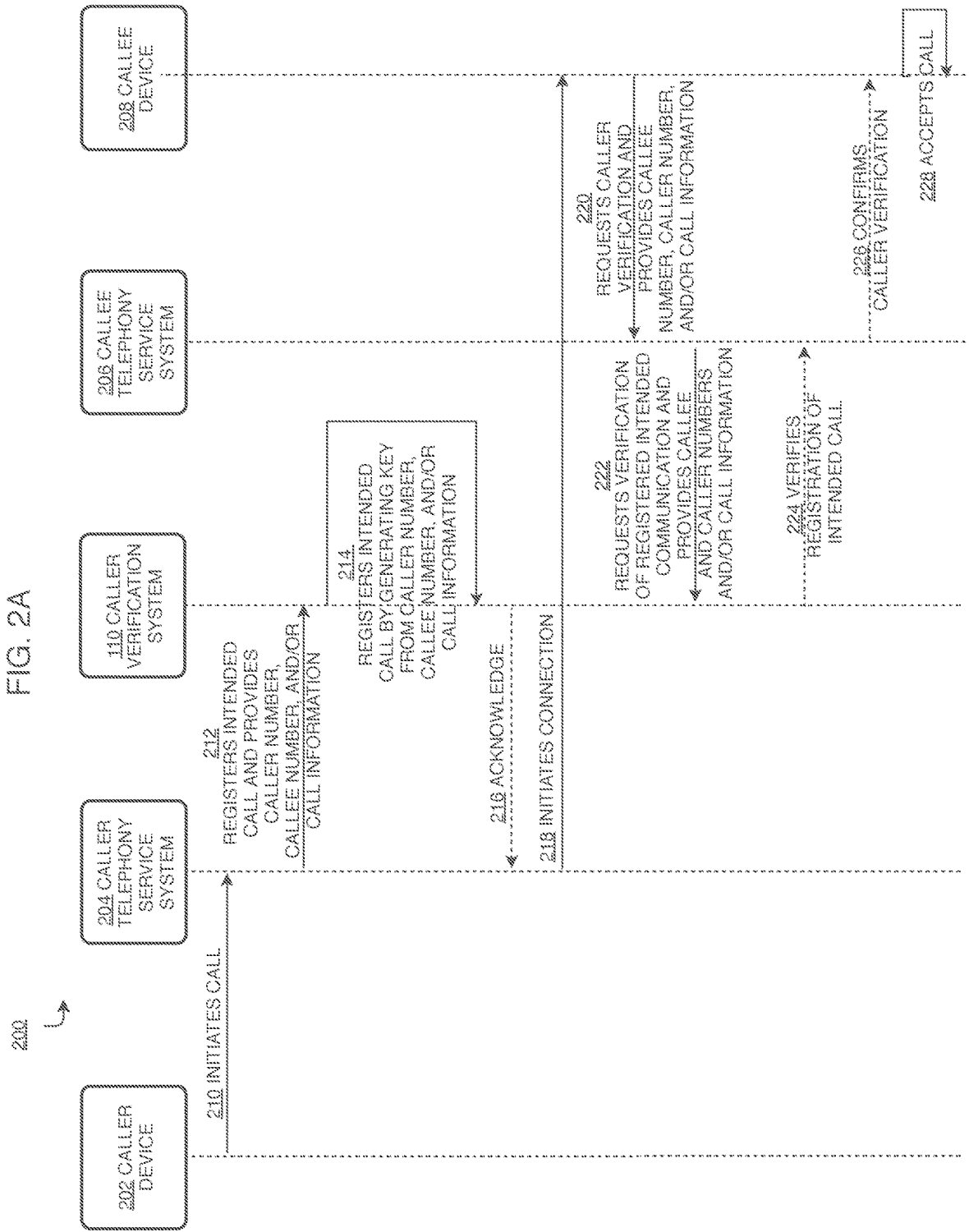

FIG. 2A and FIG. 2B are process flow diagrams that depict a process 200 for confirming caller verification, in an embodiment. This particular embodiment illustrates one method in which a caller verification is confirmed, and a call completed in response. While reference to specific types of data or information is made, these references are examples and are not intended to be limiting. Moreover, while reference to specific steps is made, certain embodiments may include less steps or additional steps.

At step 210, a caller device 202 initiates a call, via VoIP, PSTN, or any other system that supports telephony communication. The call is processed by the caller telephony service system 204, which, at step 212 registers the intended communication and provides the caller data, callee data, and communication information to a caller verification system 110. The caller data includes, for example, a caller name, a caller phone number, a caller address, or any other information related to the caller. The callee information includes, for example, a callee name, a callee phone number, a callee address, or any other information related to the callee. The communication information may include, for example, date and/or timestamps related to the call, the intent, purpose, scope, context, or topic, for the call, reference material or links relevant to the call, or any other information used in the caller verification process. In the example embodiment of FIG. 2A, the caller telephony service system 204 provides the caller phone number, callee phone number, and date and/or timestamp information related to the call. In the context of a video call or video conference, the communication information may include access credentials, user identifiers, such as a name or handle, biometric information such as a facial image, fingerprint, voiceprint, or any other information.

At step 214, the caller verification system 110 registers the intended communication session by using the data received to generate a key. For example, the session registration module 122 of the caller verification system 110 receives information indicating that the caller is using the phone number (111) 222-3333 to call a callee associated with the phone number (444) 555-6666 at 08:24:56 UTC. In some embodiments, the data is encrypted to increase security, as previously discussed herein. The session registration module 122 will generate a call time window identifier using the initiation time of the call, for example, in accordance with embodiments previously described herein. In an embodiment, this call time window identifier will also be encrypted. The session registration module 122 will then combine all the data, either encrypted or unencrypted, and then apply a hash algorithm to generate a key. For example, the caller phone number (111) 222-3333, callee phone number (444) 555-6666, and an identifier representing a quantized call time window of five minutes from 08:24:56 UTC combined together and hashed to generate a key. The key is, therefore, a hash of the caller's phone number, callee's phone number, and the call time window identifier in this particular embodiment. The key is stored in database 130 for subsequent comparison as a part of the verification process.

At step 216, the caller verification system 110 sends an acknowledgement to the caller telephony service system 204, and at step 218, the caller telephony service system 204 initiates the connection with the callee device 208. In response, the callee device 208 sends a request for caller verification at step 220. In the example embodiment of FIG. 2A, the request includes both caller phone number and the callee number, as well as call information such as date and/or timestamps associated with the call. In some embodiments, an application running on the callee device 208 is configured to generate a comparison key using the caller data, callee data, and call information. The comparison key is subsequently what is sent rather than the data. In such an embodiment, the application running on the callee device 208 would need to know the hash algorithm used by the caller verification system 110. In some embodiments, the data may be encrypted before it is hashed to generate the comparison key. In such embodiments, the application running on the callee device 208 would need to know the encryption algorithm used by the caller verification system 110. In other embodiments, the caller verification system 110 generates the comparison key, as further described herein. The callee telephony service system 206 receives the request and, at step 222, sends the verification request to the caller verification system 110. In sending the request to the caller verification system 110 all relevant caller, callee, and call data is relayed.

At step 224, the caller verification system 110 verifies the registration of the intended call. In one embodiment, the verification module 124 of the caller verification system 110 generates a comparison key based on the data provided along with the request. For instance, the request may contain the caller phone number (111) 222-3333, callee phone number (444) 555-6666, and a 08:25:21 UTC timestamp for when the callee device 208 sent the verification request. In an embodiment, the 08:25:21 UTC timestamp may be quantized into a five-minute call time window from when the call was initiated by the caller device 202 and assigned an identifier. In some embodiments, the verification module 124 will encrypt caller, callee, and call data using the same encryption algorithm described at step 214. The verification module 124 will combine the caller phone number (111) 222-3333, callee phone number (444) 555-6666, and the call time window identifier, either encrypted or unencrypted, and then apply the same hash algorithm applied at step 214 to generate a comparison key. The verification module 124 will then compare the comparison key with keys stored in database 130. If the comparison key matches a key stored in the database 130, then the caller and the intended communication has been confirmed as trusted. If the comparison key does not match a key stored in the database 130, then the caller and the intended communication has not been confirmed as trusted. In the example embodiment of FIG. 2A, the caller has been verified and the verification results are sent to the callee telephony service system 206.

At step 226, the callee telephony service system 206 relays the results of the successful caller verification to the callee device 208. In some embodiments, the results may be displayed at the callee device 208 in the form of a confirmation notification that the caller has been verified as a trusted caller. In other embodiments, the results may also be displayed at the callee device 208 in the form of a confidence score generated by the monitoring module 128. The confidence score indicates a level of confidence that the caller verification system 110 has in the verification determination. At step 228, in response to receiving the results of the successful caller verification, the call is accepted using the callee device 208.

The process 200 continues in FIG. 2B with step 230. In response to step 228 of accepting the call, the callee device sends an indication of the call acceptance to the callee telephony service system 206. As a result, the callee telephony service system 206 connects the callers at step 232. Step 234 indicates an on-going call between caller device 202 and callee device 208. When the caller and callee have finished, the callee device 208 indicates that the callee device 208 has hung up at step 236. In response, the callee telephony service system 206 terminates the call and any services provided in relation to that call at step 238, while the caller telephony service system 204 similarly terminates the call and services provided in relation to that call on their end at step 240. At step 242, the callee telephony service system sends a notification of the call termination to the caller verification system 110. Once the caller verification system 110 receives the notification, it expires the record for the particular communication session at step 244. Expiring the record includes deleting, discarding, flagging, or altering any information associated with the particular call session, in part or in whole, as previously described herein. At step 246, the caller verification system 110 returns a confirmation to the callee telephony service system 206.

In some embodiments, the caller verification system 110 is applied to verify video conference calls. In some embodiments, in the event of a non-scheduled, real-time video conference, the invitee(s) client device(s) use the caller verification system 110 to verify that the inviter's client device(s) has pre-registered the communication session. For example, similar to step 210 and step 212 of FIG. 2A, an inviter's client device may pre-reigster an intended communication session with the caller verification system 110 by providing information pertaining to the inviter and/or invitee, such as user identifiers (e.g. a full name or handle), access credentials, phone numbers, device identifiers such as Media Access Control (MAC) addresses, Internet Protocol (IP) address, biometric information such as facial images, fingerprint information, or voiceprint information, date and/or time information for generating a time window, or any other information. The caller verification system registers the intended communication session by generating a key using the information provided, similar to step 214. In some embodiments, generating the key includes converting the provided information into a hashable format and/or hashing the information provided. Subsequently, the invitee's device will receive a request to initiate the video conferencing session. The invitee's client device will subsequently request verification of the registered intended communication by providing verification information, such as user identifiers (e.g. a full name or handle), access credentials, phone numbers, device identifiers such as MAC addresses, IP address, biometric information such as facial images, fingerprint information, or voiceprint information, date and/or time information for generating a time window, or any other information. In some embodiments, the verification information will be a comparison key generated from converting the information from the invitee's client device into a hashable format and/or hashing the information from the invitee's client device. Subsequently, the caller verification system 110 will compare the comparison key with the key and verify the intended communication session. If the video conferencing session is verified, then the inviter's identity has been confirmed and the inviter is trusted. If the video conferencing session is not verified, then the inviter's identity has not been confirmed and the inviter is not trusted.

In the event that a video conferencing session is scheduled for a future time, a time window for the moment of scheduling the session may be used rather than using the future time that the session is scheduled for. In the case of a data breach where all future scheduled times for video conferencing sessions are compromised, using those compromised future scheduled times to verify the inviter would not ensure accurate verification results, leading to increased security concerns. However, in this embodiment, the time that the scheduling occurred is used to pre-register an intended communication session. For example, the moment a video conferencing session is scheduled for a future time, an invitee's client device sends the date and/or timestamp to the caller verification system 110. Any other information, such as user identifiers (e.g. a full name or handle), access credentials, phone numbers, device identifiers such as MAC addresses, IP address, biometric information such as facial images, fingerprint information, or voiceprint information, or any other information may also be sent. A key may be generated using any of the provided information, in accordance with embodiments previously described herein. Subsequently, the invitee's client device may use a date and/or timestamp of when the session was scheduled to generate a comparison key, in accordance with embodiments previously described herein. This may occur when the scheduled time for the video conferencing session has arrived, or when the invitee sends a confirmation accepting the scheduled future time. The comparison key may be sent to the caller verification system 110 to compare with the key. If the comparison key matches the key, then the video conferencing session is verified, the inviter's identity has been confirmed, and the inviter is trusted. If the comparison key does not match the key, then the video conferencing session is not verified, the inviter's identity has not been confirmed, and the inviter is not trusted.

Figure 3A:
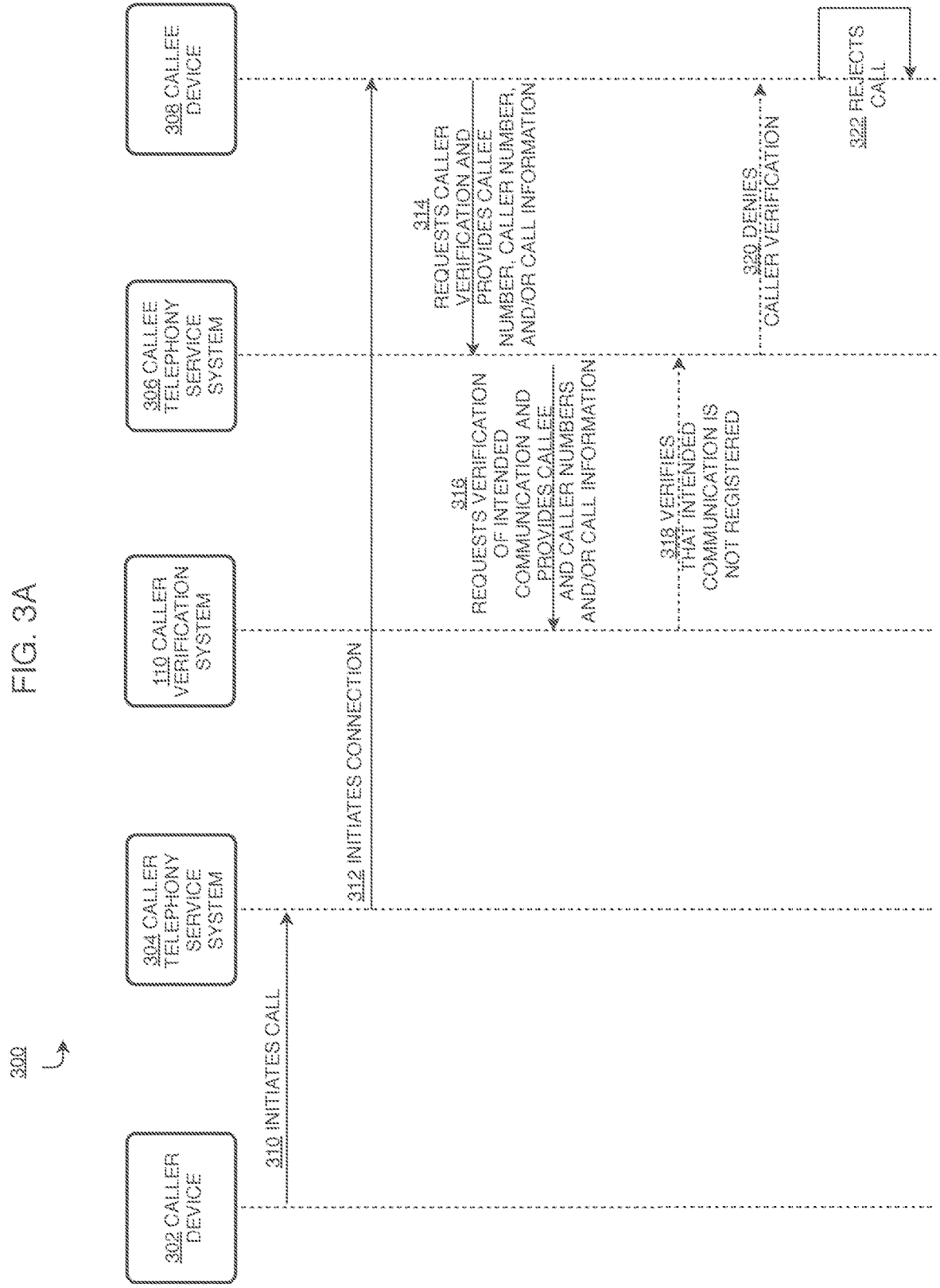
FIG. 3A and FIG. 3B are process flow diagrams that depict a process for denying caller verification, in an embodiment.

FIG. 3A is a process flow diagram that depicts a process 300 for denying caller verification, in an embodiment. This particular embodiment illustrates one method in which a caller verification is denied, and a call rejected in response. Specifically, the caller device 302 is an unverified device, such as a bad actor, that attempts to make a call to a callee device 308, which belongs to an organization or individual that does subscribe to the caller verification service. While reference to specific types of data or information is made, these references are examples and are not intended to be limiting. Moreover, while reference to specific steps is made, certain embodiments may include less steps or additional steps.

At step 310, a caller device 302 initiates a call, via VoIP, PSTN, or any other system that supports telephony communication. The call is processed by the caller telephony service system 304, which, at step 312 initiates a connection to the callee device 308. Since the caller device 302 does not belong to an organization or individual that has subscribed to the caller verification system in partnership with the caller telephony service system 304, the caller telephony service system 304 initiates the connection with the callee device 208 without registering the intended communication session.

In response to receiving the attempted connection at step 312, the callee device 308 sends a request to the callee telephony service system 306 requesting caller verification at step 314. In the example embodiment of FIG. 3A, the request includes both caller phone number and the callee number, as well as call information such as timestamps associated with the attempted call. In some embodiments, an application running on the callee device 208 is configured to generate a comparison key using the caller data, callee data, and call information. The comparison key is subsequently what is sent rather than the data. In some embodiments, the data may be encrypted before it is hashed to generate the comparison key. In other embodiments, the caller verification system 110 generates the comparison key, as further described herein. The callee telephony service system 306 receives the request and, at step 316 sends a request for verification of the intended communication to the caller verification system 110. The request for verification includes the callee number, the caller number, and call information, such as timestamps associated with the attempted call. In the context of a video call or video conference, the request for verification may include access credentials, user identifiers, such as a name or handle, biometric information such as a facial image, fingerprint, voiceprint, or any other information.

At step 318, the caller verification system 110 verifies that the intended call is not registered. To do this, the verification module 124 of the caller verification system 110 generates a comparison key based on the data provided along with the request. For instance, the request may contain the caller phone number (111) 222-3333, callee phone number (444) 555-6666, and a 08:25:21 UTC timestamp for when the callee device 208 sent the verification request. In an embodiment, the 08:25:21 UTC timestamp may be quantized into a five-minute call time window from when the call was initiated by the caller device 202 and assigned an identifier. In some embodiments, the verification module 124 will encrypt caller, callee, and call data using the same encryption algorithm described at step 214. The verification module 124 will combine the caller phone number (111) 222-3333, callee phone number (444) 555-6666, and the call time window identifier, either encrypted or unencrypted, and then apply a hash algorithm to generate a comparison key. The verification module 124 will then compare the comparison key with the keys stored in database 130. If the comparison key matches a key stored in the database 130, then the caller and the intended communication has been confirmed as trusted. If the comparison key does not match a key stored in the database 130, then the caller and the intended communication has not been confirmed as trusted. In the example embodiment of FIG. 3A, the caller verification system 110 is unable to find a matching key stored in the database 130. In some embodiments, the caller verification system 110 logs the failure to confirm a registered communication session and all available information associated with the failure to confirm. The monitoring module 128 uses the data from such failures to evaluate and determine reputation scores, confidence scores, suspicious activity, probationary periods, and so forth. Consequently, the caller verification system 110, verifies that the intended communication is not registered, and the results are sent to the callee telephony service system 306.

At step 320, the callee telephony service system 306 relays the results of the unsuccessful caller verification to the callee device 308. In some embodiments, the results may be displayed at the callee device 308 in the form of a warning notification that the caller has not been verified as a trusted caller. In other embodiments, the results may also be displayed at the callee device 308 in the form of a confidence score generated by the monitoring module 128. The confidence score indicates a level of confidence that the caller verification system 110 has in the verification determination. At step 322, in response to receiving the results of the unsuccessful caller verification, the call is rejected using the callee device 308.

Figure 3B:
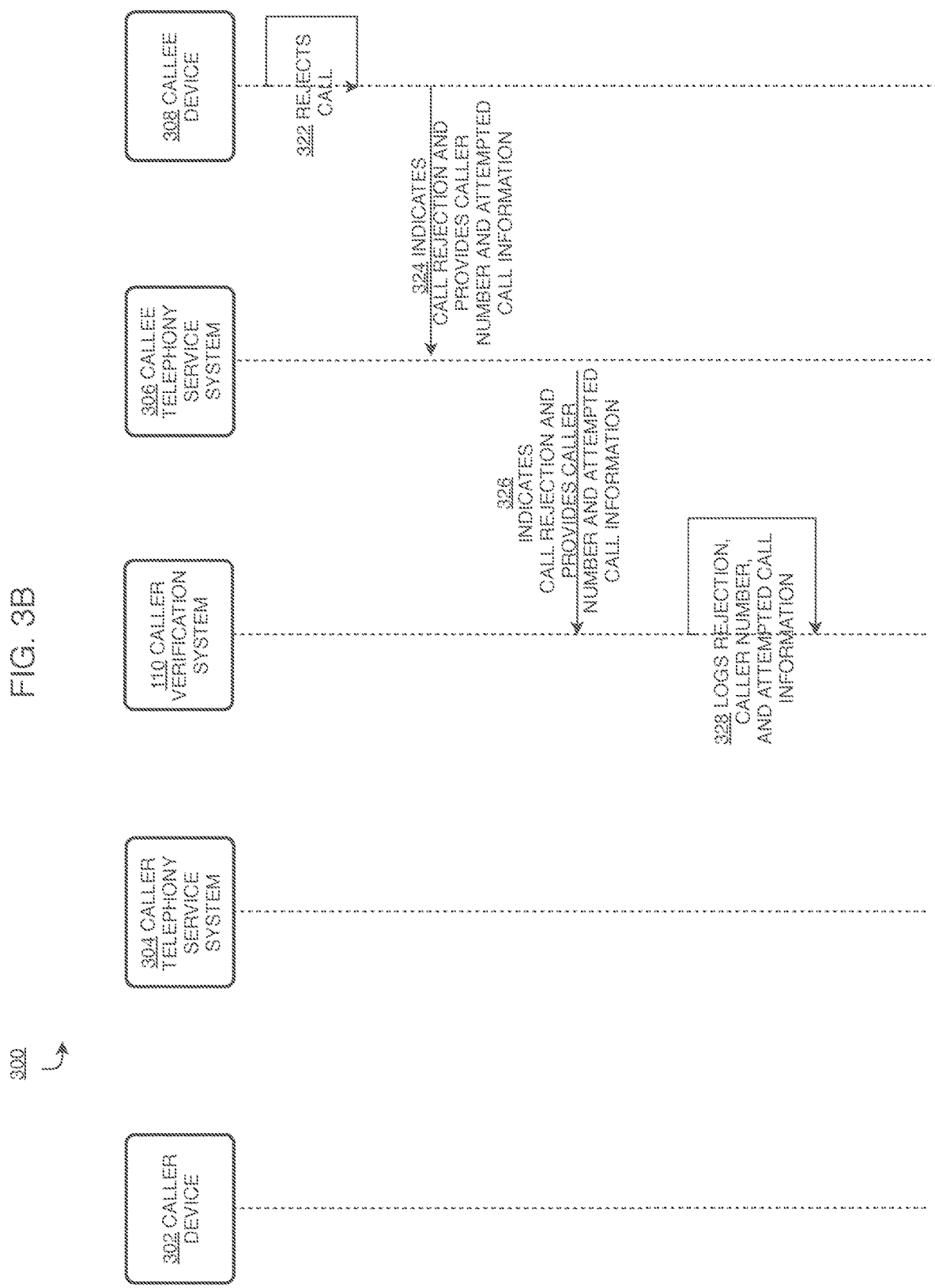

The process 300 continues in FIG. 3B with step 324. In response to step 322 of rejecting the call, the callee device 308 sends an indication of the call rejection to the callee telephony service system 306. The rejection includes information pertaining to the caller and attempted call, such as the caller number and timestamps for the attempted call. In some embodiments, the rejection will also include information pertaining to the callee, such as the callee phone number. At step 326, the callee telephony service system 306 notifies the caller verification system 110 of the call rejection and provides all the caller information, callee information, and/or call information to the caller verification system 110. The caller verification system 110 then logs the rejection, caller information, attempted call information, and in some embodiment, the callee information at step 328. The monitoring module 128 of the caller verification system 110 uses the data from these logged rejections to further evaluate and determine reputation scores, confidence scores, suspicious activity, probationary periods, and so forth.

Turning to the flow diagrams, the diagrams of FIG. 4, FIG. 5, and FIG. 6 depict methods 400, 500, 600. Each flow diagram herein illustrates a method or plan that may be used as a basis for programming one or more of the functional modules using a programming development environment or programming language that is deemed suitable for the task. Thus, FIG. 4, FIG. 5, and FIG. 6 are intended as illustrations, at the functional level, at which skilled persons, in the art to which this disclosure pertains, communicate with one another to describe and implement algorithms using programming. These diagrams are not intended to illustrate every instruction, method object or sub step that would be needed to program every aspect of a working program, but are provided at the high, functional level of illustration that is normally used at the high level of skill in this art to communicate the basis of developing working programs.

FIG. 4 is a flow chart that shows a pre-registration process 400. In some embodiments, the pre-registration module 120 of the caller verification system 110 is configured to perform this pre-registration process.

At step 402, a set of caller information is pre-registered. The set of caller information comprises at least a caller phone number. In some instances, when an organization or individual subscribes to the caller verification service through their telephony service provider, the phone number(s) associated with the organization or individual are pre-registered to indicate participation in the verification service. In some embodiments, additional caller information, such as the name of the organization or individual associated with the phone number(s), addresses, or any other identifying information is also included in the pre-registration process. In some instances, the pre-registration also includes pre-registering certain client devices, such as the client devices 102, 104 of FIG. 1, that are associated with those phone numbers. Identifiers associated with the client devices 102, 104, such as MAC addresses, Internet Protocol (IP) addresses, or any other identifier may be used. For example, a large financial institution with multiple users working in the fraud detection department may be pre-registered such that all participating users, their associated phone numbers, and/or their specific devices are logged as participants in the verification service.

Pre-registering the caller information and/or the client device 102, 104 associated with the caller information includes saving the information in a data store, such as database 130. In some embodiments, the information is encrypted and then saved to prevent the storage of any raw data and increase the level of security in the event of a data breach.

Optionally, at step 404, a set of callee information is pre-registered. The set of callee information comprises at least a callee phone number. In the example above of the large financial institution, it is reasonable for customers of the large financial institution to receive calls from the fraud department to warn of any potentially fraudulent charges. Consequently, in an embodiment, the phone numbers associated with the callee customers are pre-registered with the caller verification system 110 to indicate participation in the verification service. In some instances, additional callee information, such as a name, address, or any other identifying information is also included in the pre-registration process. In some instances, the pre-registration also includes pre-registering certain client devices, such as client device 102, 104 that are associated with the phone numbers. Identifiers associated with the client devices 102, 104, such as MAC address, IP address, or any other identifier may be used.

In some embodiments, the pre-registration process also includes enabling users to choose matching security tokens. For example, in the case of the corporate executive and the personal lawyer, both users agree to adopt a shared communication token in order to verify each other's identity in communications. In some embodiments, the shared communication token may be chosen and confirmed at the pre-registration stage. After the pre-registration process 400, the process for verifying callers using additionally the shared communication token is used.

FIG. 5 is a flow chart that shows an improved process 500 for verifying callers, in an embodiment. At step 502, the method comprises registering an intended communication session by generating a key using, at least a first call time window identifier. In some embodiments, the session registration module 122 of the caller verification system 110 is configured to register this intended communication session by generating the key. The key is generated by applying a hash algorithm to a set of data collectively referred to as the registered communication item, in some embodiments. The registered communication item may be encrypted or unencrypted data representing caller data, callee data, a call time window identifier computed based on a date and/or timestamp from the call, a cryptographic salt, a shared communication token, and/or any other data described herein in association with the registered communication item. In some embodiments where the data is unencrypted, an encryption algorithm is applied to encrypt the data before the hash algorithm is applied. Once the hash value representing the key is generated, the key is stored in a database, such as database 130 for subsequent use in caller verification.

At step 504, the method further comprises, in response to registering the intended communication session, receiving a request for caller verification, wherein the request comprises data representing a second call time window identifier. In some embodiments, the verification module 124 of the caller verification system 110 is configured to receive the request for caller verification. The request is forwarded by the callee telephony service system 206, 306 from the callee device 208, 308 and contains data such as caller data, callee data, and call information such as a date and/or timestamp data associated with the call with which a call time window identifier may be generated, a cryptographic salt, a shared communication token, and/or any other data. In some embodiments, the date and/or timestamp data may be used to generate the second call time window identifier, in accordance with embodiments previously described herein. In some embodiments, all the received data is unencrypted and needs to be encrypted by the same encryption algorithm used in step 502.

At step 506, the method further comprises, in response to receiving the request for caller verification, generating a comparison key based on the request. In some embodiments, the verification module 124 generates the comparison key by combining the caller data, callee data, second call time window identifier, cryptographic salt, shared communication token, and/or any other data and hashing it using the same hash algorithm used in step 502.

At step 508, the method further comprises comparing the comparison key with keys stored in the database. In some embodiments, the verification module 124 is configured to access the keys stored in database 130 and compare the keys with the comparison key generated at step 506. In some embodiments, the comparison would be a direct comparison of the hash values. If the comparison key matches a key stored in database 130, then the caller's identity has been confirmed and the call session is verified. If the comparison key does not match a key stored in database 130, then the caller's identity has not been confirmed and the call session is not verified.

At step 510, the method further comprises verifying the intended communication session in response to comparing the comparison key with the keys stored in database 130. In some embodiments, the verification module 124 is configured to verify the intended communication session by sending notifications. The notifications may indicate that the call session has been verified or that the call session has not been verified. A verified call session indicates that the caller's identify has been confirmed and that the caller is trusted. An unverified call session indicates that the caller's identity has not been confirmed and that the caller is untrusted. The notification may include the identity of a verified caller, a warning that the caller has not been verified, confidence scores indicating a level of confidence that the caller verification system 110 has in the verification determination.

FIG. 6 is a flow chart that shows a process 600 for expiring a registered communication session. At step 602, the method comprises receiving notification of a termination event. In some embodiments, the monitoring module 128 is configured to receive and identify these notifications of specific events that have been designated termination events. The termination event may be, for example, the end of a call, a rejection of a call by a callee device, and so forth. At step 604, the method further comprises, in response to receiving notification of the termination event, expiring the intended communication session. Expiring may include unregistering the intended communication session by deleting, discarding, flagging, or otherwise altering, in whole or in part, the data associated with the communication.

What is claimed is:

1. A computer-implemented method for improving caller verification, the method comprising:
    registering an intended communication session by hashing a first session-specific information to generate a key;
    receiving a second session-specific information;
    hashing the second session-specific information to generate a comparison key; and
    verifying the intended communication session by comparing the comparison key with the key.

2. The computer-implemented method of claim 1, wherein the first session-specific information comprises a first call time window identifier, a first caller data, and a first callee data, and wherein the session-specific information comprises a second call window, a second caller data, and a second callee data.

3. The computer-implemented method of claim 1, wherein generating the key further comprises using a first cryptographic salt or a first shared communications token, and wherein generating the comparison key further comprises using a second cryptographic salt or a second shared communications token.

4. The computer-implemented method of claim 1, wherein comparing the comparison key with the key comprises determining that the comparison key matches the key, and wherein verifying the intended communication session comprises causing the sending of a notification of a verified call.

5. The computer-implemented method of claim 1, wherein comparing the comparison key with the key comprises determining that the comparison key does not match the key, and wherein verifying the intended communication session comprises causing the sending of a notification of an unverified call.

6. The computer-implemented method of claim 1, further comprising:
    pre-registering the first session-specific information, wherein the first session-specific information comprises at least a caller phone number;
    pre-registering the second session-specific information, wherein the second session-specific information comprises at least a callee phone number.

7. The computer-implemented method of claim 1, further comprising receiving a request to verify the intended communication session, and wherein the request comprises the second session-specific information.

8. The computer-implemented method of claim 1, wherein the intended communication session is a telephone call or a video call.

9. A non-transitory, computer-readable medium storing a set of instructions that, when executed by a processor, cause:
    registering an intended communication session by hashing a first session-specific information to generate a key;
    receiving a second session-specific information;
    hashing the second session-specific information to generate a comparison key; and
    verifying the intended communication session by comparing the comparison key with the key.

10. The non-transitory, computer-readable medium of claim 9, wherein the first session-specific information comprises a first call time window identifier, a first caller data, and a first callee data, and wherein the session-specific information comprises a second call window, a second caller data, and a second callee data.

11. The non-transitory, computer-readable medium of claim 9, wherein generating the key further comprises using a first cryptographic salt or a first shared communications token, and wherein generating the comparison key further comprises using a second cryptographic salt or a second shared communications token.

12. The non-transitory, computer-readable medium of claim 9, wherein comparing the comparison key with the key comprises determining that the comparison key matches the key, and wherein verifying the second communication session comprises causing the sending of a notification of a verified call.

13. The non-transitory, computer-readable medium of claim 9, wherein comparing the comparison key with the key comprises determining that the comparison key does not match the key, and wherein verifying the second communication session comprises causing the sending of a notification of an unverified call.

14. The non-transitory, computer-readable medium of claim 9, storing a set of further instructions that, when executed by the processor, cause receiving a request to verify the intended communication session, and wherein the request comprises the second session-specific information.

15. The non-transitory, computer-readable medium of claim 9, storing a set of further instructions that, when executed by the processor, cause:
    pre-registering the first session-specific information, wherein the first session-specific information comprises at least a caller phone number;
    pre-registering the second session-specific information, wherein the second session-specific information comprises at least a callee phone number.

16. The non-transitory, computer-readable medium of claim 9, wherein the second communication session is a telephone call or a video call.

17. A system for improving caller verification, the system comprising:
- a processor;
- a memory operatively connected to the processor and storing instructions that, when executed by the processor, cause:
  - registering an intended communication session by hashing a first session-specific information to generate a key;
  - receiving a second session-specific information;
  - hashing the second session-specific information to generate a comparison key; and
  - verifying the intended communication session by comparing the comparison key with the key.

18. The system of claim 17, wherein the first session-specific information comprises a first call time window identifier, a first caller data, and a first callee data, and wherein the session-specific information comprises a second call window, a second caller data, and a second callee data.

19. The system of claim 17, wherein generating the key further comprises using a first cryptographic salt or a first shared communications token, and wherein generating the comparison key further comprises using a second cryptographic salt or a second shared communications token.

20. The system of claim 17, wherein the memory stores further instructions that, when executed by the processor, cause receiving a request to verify the intended communication session, and wherein the request comprises the second session-specific information.

* * * * *